United States Patent
Liao et al.

(10) Patent No.: US 10,217,224 B2
(45) Date of Patent: Feb. 26, 2019

(54) METHOD AND SYSTEM FOR SHARING-ORIENTED PERSONALIZED ROUTE PLANNING VIA A CUSTOMIZABLE MULTIMEDIA APPROACH

(71) Applicant: TCL RESEARCH AMERICA INC., San Jose, CA (US)

(72) Inventors: Xinpeng Liao, San Jose, CA (US); Xiaobo Ren, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 197 days.

(21) Appl. No.: 15/388,852

(22) Filed: Dec. 22, 2016

(65) Prior Publication Data
US 2018/0182105 A1   Jun. 28, 2018

(51) Int. Cl.
| | | |
|---|---|---|
| *G06K 9/00* | (2006.01) | |
| *G06T 7/149* | (2017.01) | |
| *G06T 11/60* | (2006.01) | |
| *H04L 12/58* | (2006.01) | |
| *G06F 17/30* | (2006.01) | |

(52) U.S. Cl.
CPC ........ *G06T 7/149* (2017.01); *G06F 17/30241* (2013.01); *G06F 17/30259* (2013.01); *G06F 17/30268* (2013.01); *G06F 17/30277* (2013.01); *G06T 11/60* (2013.01); *H04L 51/32* (2013.01); *G06T 2207/20101* (2013.01); *G06T 2207/20116* (2013.01); *G06T 2210/12* (2013.01)

(58) Field of Classification Search
CPC ...................................................... G08G 1/166
See application file for complete search history.

(56) References Cited

U.S. PATENT DOCUMENTS

| | | | | |
|---|---|---|---|---|
| 8,843,515 B2* | 9/2014 | Burris | ................. | G06F 17/3087 |
| | | | | 707/769 |
| 9,939,272 B1* | 4/2018 | Liao | .................... | G06K 9/00664 |
| 2010/0305858 A1* | 12/2010 | Richardson | ........ | G06K 9/00785 |
| | | | | 701/301 |
| 2011/0170744 A1* | 7/2011 | Malinovskiy | ...... | G06K 9/00771 |
| | | | | 382/103 |

(Continued)

OTHER PUBLICATIONS

Wang, Chieh-Chih, et al. "Simultaneous localization, mapping and moving object tracking." The International Journal of Robotics Research 26.9 (2007): 889-916.*

(Continued)

*Primary Examiner* — Avinash Yentrapati
(74) *Attorney, Agent, or Firm* — Anova Law Group, PLLC (57) ABSTRACT

In accordance with some embodiments of the disclosed subject matter, a method and a system for recommending and sharing customized multimedia route planning are provided. The method includes: receiving a query image from a user, the query image containing an object-of-interest of the user, performing an integrative segmentation process to determine one or more contours of the object-of-interest in the query image; determining a route having a maximum area overlap with the one or more contours of object-of-interest on a map image; generating an output image including the object-of-interest and the route; and recommending the output image to the user, and sharing the output image on a social network platform.

20 Claims, 6 Drawing Sheets

(56) References Cited

U.S. PATENT DOCUMENTS

2012/0207360 A1\* 8/2012 Mehanian ............ G06K 9/0014
   382/128
2015/0110344 A1\* 4/2015 Okumura ........... G06K 9/00624
   382/103

OTHER PUBLICATIONS

McGuinness, Kevin, and Noel E. O'connor. "A comparative evaluation of interactive segmentation algorithms." Pattern Recognition 43.2 (2010): 434-444.\*

\* cited by examiner

METHOD AND SYSTEM FOR SHARING-ORIENTED PERSONALIZED ROUTE PLANNING VIA A CUSTOMIZABLE MULTIMEDIA APPROACH

FIELD OF THE INVENTION

The present invention generally relates to the field of information technology and social media technologies and, more particularly, to a method for recommending and sharing customized multimedia route planning and system thereof.

BACKGROUND

The past decade has seen the prevailing of social networking sites that are tremendously changing the way of human interactions. The currency of social media is sharing. With rapid development of social network multimedia platforms, people share massive amount of their status messages on social media. For example, people can post and share personalized articles, photos, audios, videos on a social network multimedia platform, such as Facebook, Twitter, YouTube, WeChat, etc. Users can share different multimedia content to certain audience, such as followers, friends, groups, or publics. However, harnessing powerful social media sharing strategies to build a bigger and more engaged audience for achieving better human interaction experiences can be a challenge.

The disclosed methods and systems are directed to solve one or more problems set forth above and other problems.

BRIEF SUMMARY OF THE DISCLOSURE

In accordance with some embodiments of the disclosed subject matter, a method and a system for recommending and sharing customized multimedia route planning are provided.

One aspect of the present disclosure includes a method for recommending and sharing customized multimedia route planning, comprising: receiving a query image from a user, the query image containing an object-of-interest of the user; performing an integrative segmentation process to determine one or more contours of the object-of-interest in the query image; determining a route having a maximum area overlap with the one or more contours of object-of-interest on a map image; generating an output image including the object-of-interest and the route; and recommending the output image to the user, and sharing the output image on a social network platform.

In some embodiments, the method further comprises: receiving additional user specified information with the query image; wherein the additional user specified information includes an object bounding box, a user geographical location, a map ratio, and an expected route length.

In some embodiments, the map image is obtained from an online map application based on the user geographical location and the map ratio; and the route is determined based on the one or more contours of the object-of-interest in the query image, the map image, and the expected route length.

In some embodiments, the integrative segmentation process comprises: performing an initialization of the query image to obtain an initial trimap; performing a first automatic segmentation process to identify an approximate border of the object-of-interest from the initial trimap; performing a user interaction process to edit a segmentation result of the first automatic segmentation process to generate an updated trimap; and performing a second automatic segmentation process to identify an accurate border of the object-of-interest from the updated trimap.

In some embodiments, performing an initialization of the query image comprises: determining an initial foreground region, an initial background region, and an initial remaining region of the query image based on the object bounding box; and setting Gaussian Mixture Models to each pixel in the initial foreground region and the initial background region.

In some embodiments, performing the first automatic segmentation process comprises: assigning Gaussian Mixture Model components to each pixel in the initial remaining region; learning Gaussian Mixture Model parameters from data of grey values of the initial trimap; determining an estimate segmentation by using a minimum cut estimation algorithm to solve an equation of Gibbs energy, wherein the equation of Gibbs energy depends on the Gaussian Mixture Model components and the Gaussian Mixture Model parameters; repeating the above three steps until a condition of convergence of iterative minimization is satisfied; and performing a border matting to generate the approximate border of the object-of-interest from the initial trimap.

In some embodiments, performing the user interaction process comprises: receiving user input on the segmentation result of the first automatic segmentation process, wherein the user input includes at least one of a background brush and a foreground brush; fixing pixels corresponding to areas indicated by the background brush and the foreground brush respectively; and updating the segmentation result of the query image accordingly to generate the updated trimap.

In some embodiments, performing the second automatic segmentation process comprises: determining an updated segmentation of the update trimap by using a minimum cut estimation algorithm; and performing a refine operation to identify the accurate border of the object-of-interest from the updated trimap.

In some embodiments, the refine operation comprises: assigning Gaussian Mixture Model components to each pixel in an updated remaining region of the update trimap; learning Gaussian Mixture Model parameters from data of grey values of the updated trimap; determining an estimate segmentation by using a minimum cut estimation algorithm to solve an equation of Gibbs energy, wherein the equation of Gibbs energy depends on the Gaussian Mixture Model components and the Gaussian Mixture Model parameters; repeating the above three steps until a condition of convergence of iterative minimization is satisfied; and performing a border matting to generate the accurate border of the object-of-interest from the updated trimap; wherein the accurate border includes the one or more contours of object-of-interest.

In some embodiments, wherein determining the route having the maximum area overlap with the one or more contours of object-of-interest on the map image comprises: employing a MorphSnakes algorithm to search a route candidate on the map image in eight different orientations; using a morphological Geodesic Active Contour framework to evolve the route candidate by minimizing an energy functional; and performing an evaluation method using distortion error to determine the route having the maximum area overlap with the one or more contours of object-of-interest on the map image.

In some embodiments, the energy functional is represented as:

$$E(C) = \int_0^{length(C)} g(I)(C(s)) ds = \int_0^1 g(I)(C(p) \cdot |C_p|) dp,$$

wherein |ds|=|C_p|dp is an Euclidean arc-length parametrization of a curve C; and g(I) is a mapping: $\mathbb{R}^d \to \mathbb{R}^+$, $x \to g(I)(x)$, which allows selecting regions-of-interest in the image I.

In some embodiments, employing the MorphSnakes algorithm comprises: approximating numerical solutions of partial differential equations of curve evolution of the route candidate by successively applying a set of curvature morphological operators; wherein the set of curvature morphological operators are defined on a binary level-set function.

In some embodiments, the method further comprises: introducing a norm metric between two successive level sets of the binary level-set function to assess a convergence of the curve evolution of the route candidate.

Another aspect of the present disclosure provides a system for recommending and sharing customized multimedia route planning, comprising one or more hardware processors, memory, and one or more program modules stored in the memory and to be executed by the one or more processors, the one or more program modules comprising: a query image receiving module configured for receiving a query image from a user, the query image containing an object-of-interest of the user, an integrative segmenting module configured for performing an integrative segmentation process to determine one or more contours of the object-of-interest in the query image; a route planning module configured for determining a route having a maximum area overlap with the one or more contours of object-of-interest on a map image; an image fusing module configured for generating an output image including the object-of-interest and the route; and a recommending and sharing module configure for recommending the output image to the user, and sharing the output image on a social network platform.

In some embodiments, the query image receiving module is further configured for: receiving additional user specified information with the query image; wherein: the additional user specified information includes an object bounding box, a user geographical location, a map ratio, and an expected route length; the map image is obtained from an online map application based on the user geographical location and the map ratio; and the route is determined based on the one or more contours of an object-of-interest in the query image, the map image, and the expected route length.

In some embodiments, the integrative segmenting module comprises: a trimap initialization unit configured for performing an initialization of the query image to obtain an initial trimap; an automatic segmentation unit configured for performing a first automatic segmentation process to identify an approximate border of the object-of-interest from the initial trimap; and a user interaction unit configured for performing a user interaction process to edit a segmentation result of the first automatic segmentation process to generate an updated trimap; and wherein the automatic segmentation unit is further configured for performing a second automatic segmentation process to identify an accurate border of the object-of-interest from the updated trimap.

In some embodiments, the trimap initialization unit is configured for: determining a foreground region, a background region, and a remaining region of the query image based on the object bounding box; and setting Gaussian Mixture Models to each pixel in the foreground region and the background region.

In some embodiments, the automatic segmentation unit is configured for: assigning Gaussian Mixture Model components to each pixel in the remaining region; learning Gaussian Mixture Model parameters from data of grey values of a trimap; determining an estimate segmentation by using a minimum cut estimation algorithm to solve an equation of Gibbs energy, wherein the equation of Gibbs energy depends on the Gaussian Mixture Model components and the Gaussian Mixture Model parameters; repeating the above three steps until a condition of convergence of iterative minimization is satisfied; and performing a border matting to generate a border of the object-of-interest from the trimap.

In some embodiments, the user interaction unit is configured for: receiving user input on the segmentation result of the first automatic segmentation process, wherein the user input includes at least one of a background brush and a foreground brush; fixing pixels corresponding to areas indicated by the background brush and the foreground brush respectively; and updating the segmentation result of the query image accordingly to generate the updated trimap.

In some embodiments, the route planning module comprises: a MorphSnakes route searching unit configured for employing a MorphSnakes algorithm to search a route candidate on the map image in eight different orientations; a morphological route evolving unit using a morphological Geodesic Active Contour framework to evolve the route candidate by minimizing an energy functional including: approximating numerical solutions of partial differential equations of curve evolution of the route candidate by successively applying a set of curvature morphological operators, wherein the set of curvature morphological operators are defined on a binary level-set function, and introducing a norm metric between two successive level sets of the binary level-set function to assess a convergence of the curve evolution of the route candidate; and a distortion error evaluation unit performing an evaluation method using distortion error to determine the route having the maximum area overlap with the one or more contours of object-of-interest on the map image.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

In accordance with some embodiments of the present disclosure, a method for recommending and sharing customized multimedia route planning and system thereof are provided. Specifically, the disclosed method and system and be used for recommending and sharing customized image-based route.

In some embodiments, the disclosed method and system can be initiated with a query image with specified object bounding box, user geographical location, map ratio, and expected route length, and/or other information. Given any query image, an interactive segmentation can be performed to ensure a precise segmentation for the object-of-interest in the query image. A contour of the object-of-interest can be generated for searching a route on a map based on a matching algorithm. Routes candidates can be naturally generated with a metric to evaluate the convergence of contour evolution in the light of its stability when the curve contour approaches the desired routes. In addition, the distortion error between each route candidate and user-specified contour can be minimized by performing a shrinking minimization process, hereby finalizing the matched route as the best recommendation to the user after output rendering.

Figure 1:
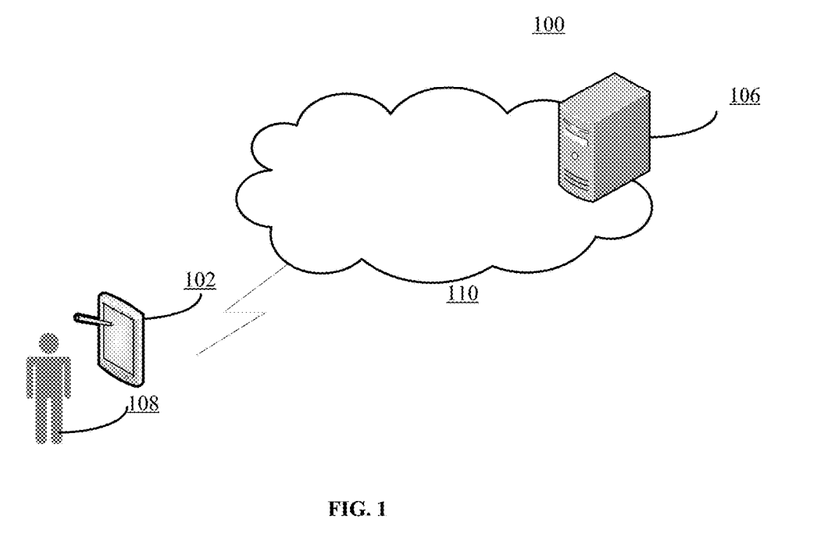
FIG. 1 illustrates an exemplary environment incorporating certain embodiments of the present disclosure.

FIG. 1 illustrates an exemplary environment 100 incorporating certain embodiments of the present invention. As shown in FIG. 1, environment 100 may include a terminal 102, a server 106, a user 108, and a network 110.

A terminal 102 (also known as a terminal device) may refer to any appropriate user terminal with certain computing capabilities, such as a personal computer (PC), a work station computer, a server computer, a hand-held computing device (tablet), a smartphone or mobile phone, or any other user-side computing device. In certain embodiments, terminal 102 may be a mobile terminal device, such as a smartphone, a tablet computer, or a mobile phone, etc. The mobile terminal 102 may be implemented on any appropriate computing platform.

The terminal 102 may be used by any user 108 to connect to network 110 and make requests to server 106. Each user 102 may use one or more terminals 102. As directed by the user 108, the terminal 102 may obtain multimedia content, such as image, video, audio, text, etc., from any appropriate sources, such as from a local storage device, from a wired or wireless network device of a service provider, or from the Internet.

Further, the server 106 may refer to one or more server computers configured to provide certain map functionalities and social media platform functionalities (e.g., map search server, image sharing platform server, etc.). The server 106 may include one or more processors to execute computer programs in parallel. The server 106 may store map information to be accessed by terminals. The server 106 may also provide various social media platforms to the terminal 102 as requested by the user 108. The server 106 may also be a cloud server.

Terminals 102 and server 106 may communicate with each other through communication network 110, such as a cable network, a phone network, and/or a satellite network, etc. Although one user 108, one terminal 102, and one server 106 are shown in FIG. 1, any number of users, terminals, and/or servers may be included.

Figure 2:
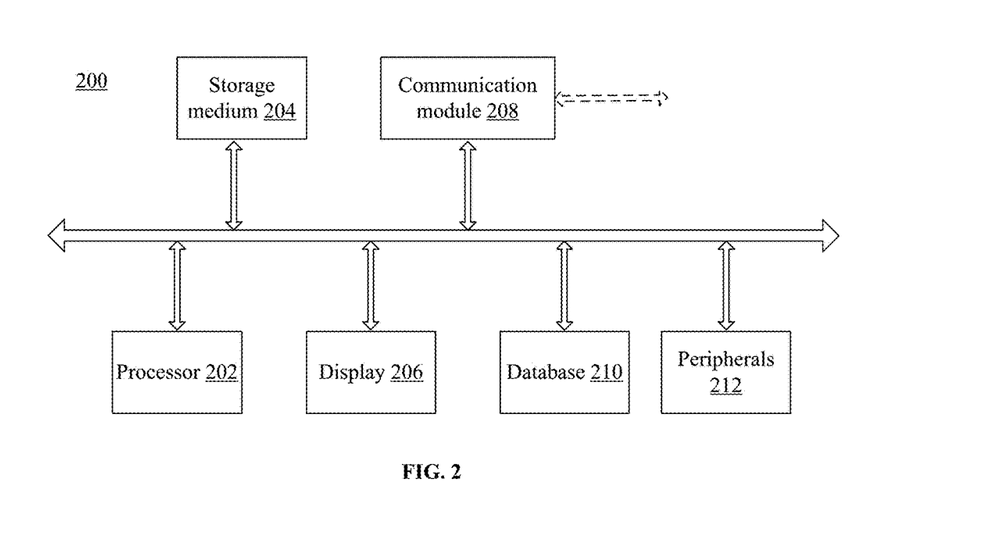
FIG. 2 illustrates an exemplary computing system consistent with some embodiments of the present disclosure.

Terminal 102, and/or server 106 may be implemented on any appropriate computing circuitry platform. FIG. 2 shows a block diagram of an exemplary computing system 200 capable of implementing terminal 102, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate hardware processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard, mouse, touch screen, etc. Communication module 208 may include certain network interface devices for establishing connections through communication networks. Database 210 may include one or more databases for storing certain data and for performing certain operations on the stored data, such as database searching.

In operation, the user 108 may indicate, through terminal 102, a query image available on the terminal 102 or online from various servers 106. An interactive segmentation of the query image can be performed between the user 108 and the terminal 102 to obtain an object-of-interest in the query image. The terminal 102 can generate object contour for searching the route on a map application from a server 106. The route having the maximum area overlap with the contour of object-of-interest can be recommended to the user 108, and can be shared on one or more social network platforms on the servers 106.

Figure 3:
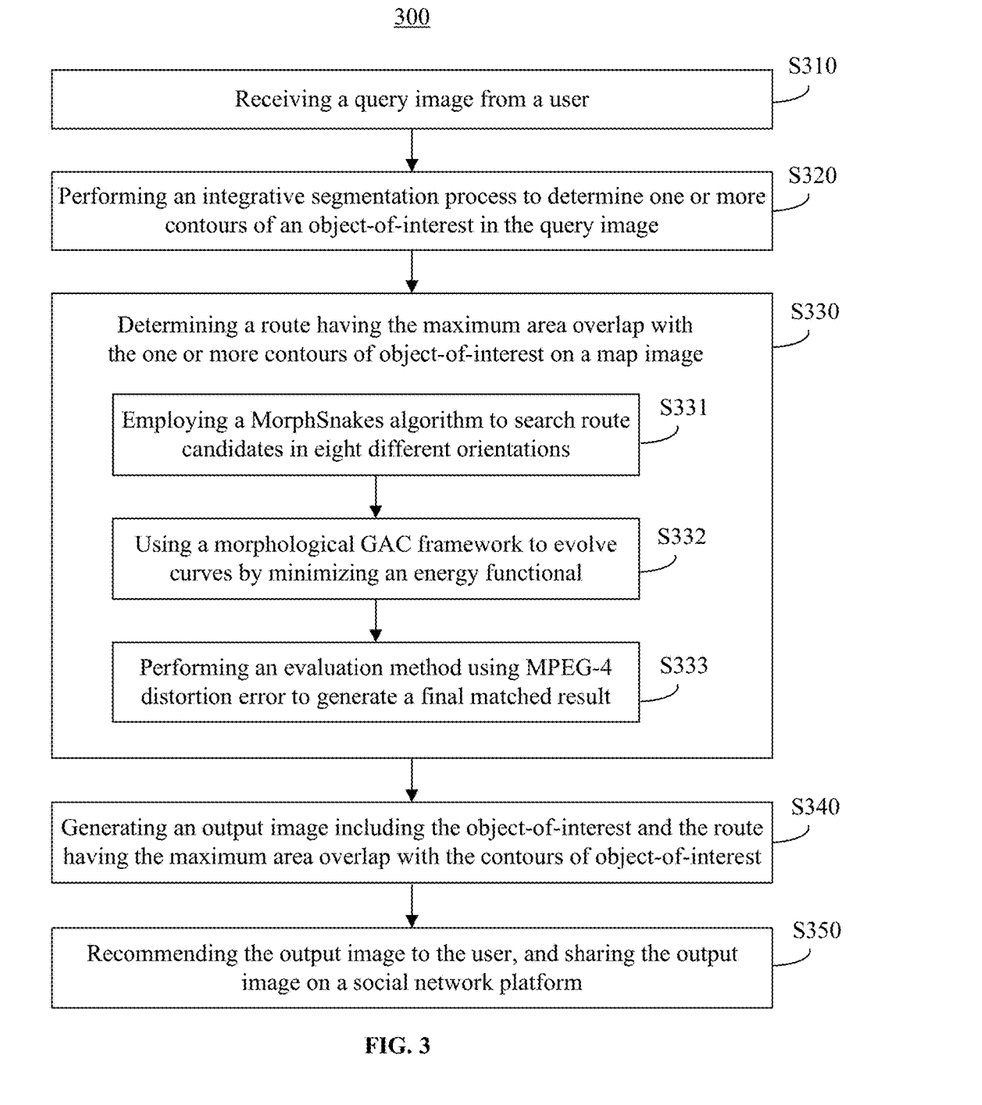
FIG. 3 illustrates a schematic flowchart of an exemplary method for recommending and sharing customized multimedia route planning consistent with some embodiments of the present disclosure.

Referring to FIG. 3, a schematic flowchart of an exemplary method for recommending and sharing customized multimedia route planning is shown consistent with some embodiments of the present disclosure.

As illustrated, the disclosed method 300 can be initiated by receiving a query image from a user at step S310. The query image can be obtained from any suitable source, such as a camera input, a local or cloud photograph album, a webpage, a video frame capture tool, etc. In some embodiments, the query image can be received with additional user specified information, including an object bounding box, a user geographical location, a map ratio, and an expected route length, etc.

Next, at step S320, an interactive segmentation process can be performed to determine one or more contours of an object-of-interest in the query image. In some embodiments, the interactive segmentation process can be performed by using a grabcut algorithm.

Figure 4:
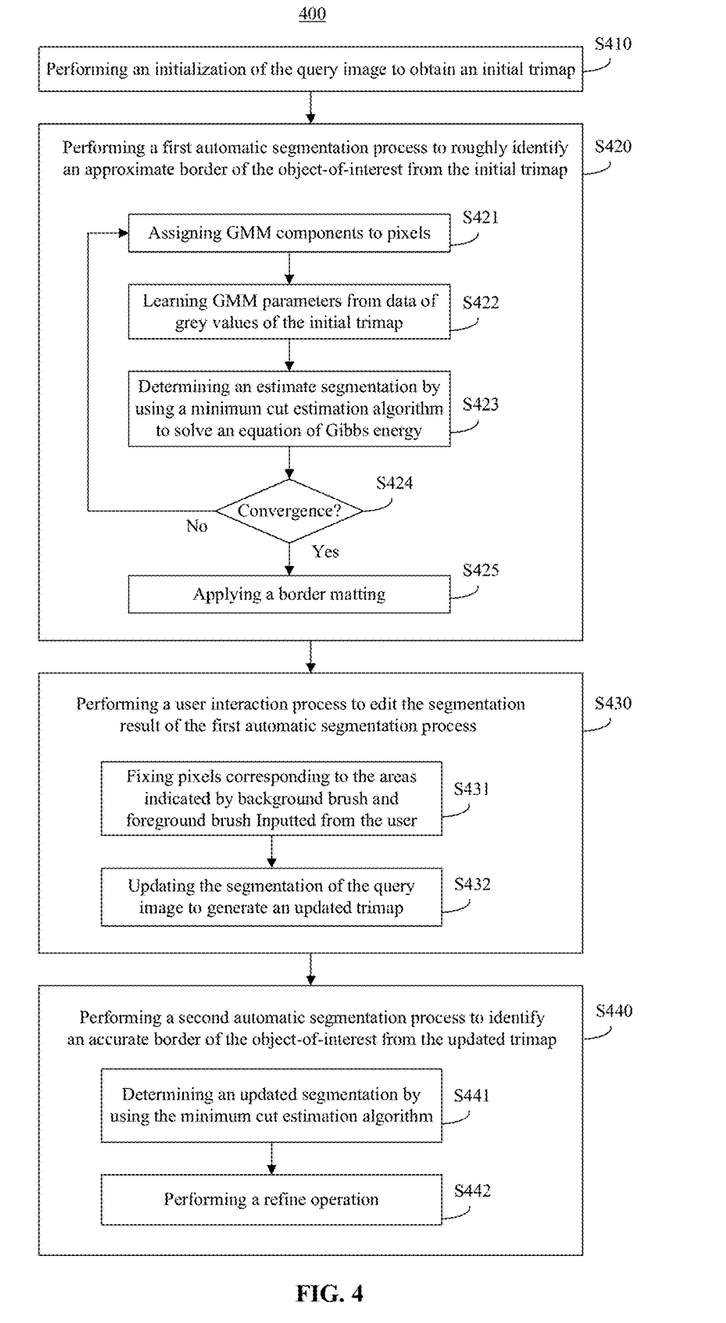
FIG. 4 illustrates a schematic flowchart of an exemplary interactive segmentation process using a grabcut algorithm consistent with some embodiments of the present disclosure.
Figure 5:
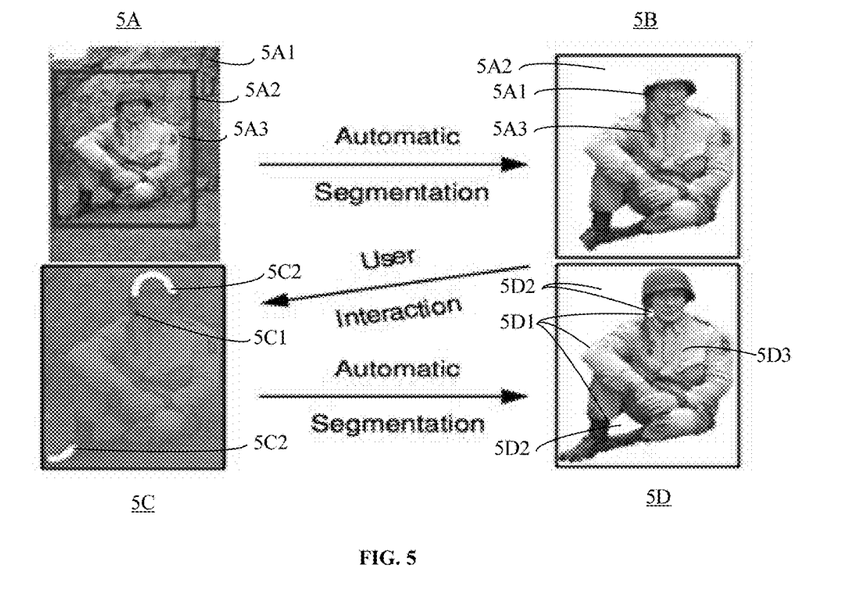
FIG. 5 illustrates schematic diagrams of exemplary images processed by an interactive segmentation process at different stages consistent with some embodiments of the present disclosure.

Referring to FIGS. 4 and 5, a schematic flowchart of an exemplary interactive segmentation process using a grabcut algorithm is shown in FIG. 4 consistent with some embodiments of the present disclosure, and exemplary images processed by the disclosed interactive segmentation process at different stages are shown in FIG. 5.

As illustrated in FIG. 4, the interactive segmentation process using the grabcut algorithm can start at step S410 for performing an initialization of the query image to obtain an initial trimap. The term of trimap used herein referred to an image including three identified regions: a foreground region, a background region, and a remaining region.

In some embodiments, the initialization can be determined by the object bounding box received with the query image at step S310. For example, as shown in FIG. 5A, by receiving a user specified object bounding box 5A2, an initial background region 5A 1 can be determined as a strip of pixels around the outside of the object bounding box 5A2, an initial foreground region can be set as zero, and an initial remaining region 5A3 can be a complement of the background region, which is the rectangle area inside of the object bounding box 5A2.

Further, the initialization of a trimap can also include setting Gaussian Mixture Models (GMMs) to each pixel in the initial foreground region and the initial background region.

Next at step S420, a first automatic segmentation process can be performed for roughly identifying an approximate border of the object-of-interest from the initial trimap. In some embodiments, the first automatic segmentation process can be realized by using an iterative energy minimization method.

As illustrated in FIG. 4, the iterative energy minimization method can include performed in the following steps.

Firstly, GMM components can be assigned to each pixel in the initial remaining region at S421, and GMM parameters can be learned from data of grey values of the initial trimap at S422.

Next, at S423, an estimate segmentation can be determined by using a minimum cut estimation algorithm to solve an equation of Gibbs energy, which depends on the GMM components and the GMM parameters.

Then, at S424, it can be determined that whether a condition of convergence of iterative minimization is satisfied. When it is determined that the condition of convergence of iterative minimization is not satisfied ("NO" at S424), the iterative energy minimization method can go back to repeat S421-S423. Generally, after certain iterations, the condition of convergence of iterative minimization can be satisfied ("YES" at S424), and the iterative energy minimization method can move forward to performed S425.

Finally, a border matting can be performed at S425. In some embodiments, a matting tool can be used to produce continuous pixels of the remaining region between the foreground region and the background region as the approximate border of the object-of-interest from the initial trimap.

As shown in FIG. 5B, after the first automatic segmentation process, the segmentation result can obtain an approximate border 5B 1 of the object-of-interest. The pixels outside of the approximate border 5B1 can be identified as the background region 5B2, and can be temperately removed from the query image. And the pixels inside of the approximate border 5B1 can be identified as the foreground region 5B3, and can be temperately retained.

Turning back to FIG. 4, at step S430, a user interaction process can be performed to edit the segmentation result of the first automatic segmentation process. In some embodiments, during the user interaction process, any suitable user input of updates of the trimap can be used to edit the segmentation result of the first automatic segmentation process. For example, as illustrated in FIG. 5C, a background brush can be used by the user for indicating one or more areas 5C1 that should belong to the background region, and a foreground brush can be used by the user for indicating one or more areas 5C2 that should belong to the foreground region.

Turning back to FIG. 4, based on the user input received during the user interaction process, the pixels corresponding to the areas indicated by the background brush and the foreground brush can be fixed at S431, and the segmentation of the query image can be updated accordingly to generate an updated trimap at S432.

Next, at step S440, a second automatic segmentation process can be performed for identifying an accurate border of the object-of-interest from the initial trimap. In some embodiments, the second automatic segmentation process can include determining an updated segmentation by using the minimum cut estimation algorithm at S441. It should be noted that, step S411 has a same procedure of step S423. That is, step S423 is performed again in the second automatic segmentation process.

In some embodiments, step S441 is only performed once in the second automatic segmentation process. And the outcome of the updated segmentation can be used to obtain the final one or more contours of an object-of-interest in the query image.

In some embodiments, after the step S441, the second automatic segmentation process also include a refine operation at S442. The refine operation includes an entire iterative minimization algorithm, which has the same procedure of the first automatic segmentation process including steps S421-S425.

That is, GMM components can be assigned to each pixel in the updated remaining region, and GMM parameters can be learned from data of grey values of the updated trimap. Next, by solving an equation of Gibbs energy depends on the GMM components and the GMM parameters, an estimate segmentation can be determined. Then, the above steps can be repeated until a condition of convergence of iterative minimization is satisfied. Generally, the energy converges over certain iterations. Finally, a border matting can be performed to determine the accurate border of the object-of-interest from the updated trimap.

As shown in FIG. 5D, the accurate border of the object-of-interest from the updated trimap may include one or more contours 5D1, and each contour is a closed loop of continuous pixels. On one side of the one or more contours 5D1, the background region 5D2 can be removed. And one the other side of the one or more contours 5D 1I, the foreground region 5D3 can be retained.

Turning back to FIG. 3, at step S330, based on the one or more contours of the object-of-interest, a route having the maximum area overlap with the one or more contours of object-of-interest can be determined on a map image.

In some embodiments, a map can be obtained from any suitable map application, such as Google map, Bing map, Tomtom map, Garmin map, etc. A map image can be generated based on the user geographical location and map ratio received at step S310.

Based on the one or more contours of the object-of-interest determined at step S320, and the expected route length received at step S310, a MorphSnakes algorithm can be employed to search route candidates in eight different orientations at S331.

Instead of using standard solution based on partial differential equations (PDE) and level-sets that requires using of numerical methods of integration, the MorphSnakes algorithm presents a morphological approach to curve evolution based on curvature morphological operators valid for surfaces of any dimension.

The morphological approach can approximate numerical solutions of curve evolution PDE by successively applying a set of curvature morphological operators defined on a binary level-set function and with equivalent infinitesimal behavior. The curvature morphological operators can be desirably fast, do not suffer numerical stability issues, and do not degrade the level-set function.

It should be noted that, by using the MorphSnakes algorithm, a curve can evolve by successive application of a set of curvature morphological operators defined on a binary level-set. However, it may not efficiently converge to a desired route candidate since a maximum iterations of such successive application can commonly be a large number predetermined. In some situations, computation time may be wasted on many iterations of successive application of curvature morphological operators even if the curve exhibits substantial stability.

To solve such problem, a L1 norm metric M can be introduced between two successive level sets, e.g., $S_1$ and $S_2$, to assess a stability or convergence of the curve evolution. In some embodiments, the L1 norm metric M can be represented by the following formula:

$$M = \|S_1 - S_2\|,$$

where each level set $S_1$ and $S_2$ is a binary matrix. With the L1 norm metric M, the convergence of each route candidate can be assessed on the fly with the computation time being reduced by one order of magnitude compared with that of predetermined maximum number of iterations.

In some embodiments, at S332, a morphological Geodesic Active Contour (GAC) framework can be used to evolve a curve C by minimizing an energy functional of Image I as the following:

$$E(C) = \int_0^{length(C)} g(I)(C(s)) ds$$
$$= \int_0^1 g(I)(C(p) \cdot |C_p|) dp,$$

where $ds = |C_p| dp$ is the Euclidean arc-length parametrization of the curve C, and $g(I): \mathbb{R}^d \to \mathbb{R}^+$, $x \to g(I)(x)$ allows selecting regions-of-interest in the image.

It should be noted that, the morphological Geodesic Active Contour (GAC) framework can be successfully applied to some query images with simple contours such as objects surrounded by discriminative background. However, in some scenarios, a searching task of route candidates on map images can be involved with massive number of curve contours that cannot be distinguished from each other due to intricate roads and tracks. Minimizing the energy functional on such map images may tend to shrink toward one single point where the total energy is zero. Such shrinking minimization process may not serve well to match user-edited contour in terms of maximum area overlap.

To address the problem described above, at S333, an evaluation method using MPEG-4 distortion error can be performed for the final recommendation result. Particularly, instead of shrinking the curve evolution, successive curvature morphological operators can be used to expand the user-edited contour outwards with certain number of iterations. Within each expansion, the shrinking minimization process can be performed until a convergence of curve is reached. The evaluation of each route candidates derived from each expansion can be formulated as follows:

$$\min_i D^i_{MPEG} = \min_i(\Omega_1 \cup \Omega_2),$$
$$\Omega_1 = A \cap \overline{B},$$
$$\Omega_2 = B \cap \overline{A},$$

where A is each expanded user-edited contour while B refers to the converged route candidate associated with A. The route candidates with minimum MPEG-4 distortion error in eight orientations can be obtained, and then a finalized best matched route can be determined.

Figure 6:
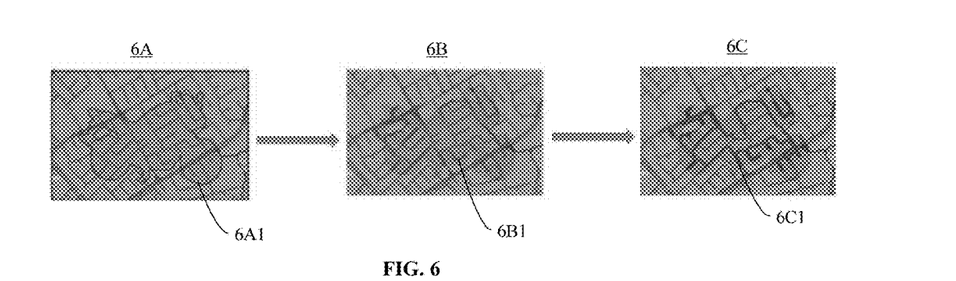
FIG. 6 illustrates schematic diagrams of exemplary route candidate images processed by a curve evolution process at different stages consistent with some embodiments of the present disclosure.

Referring to FIG. 6, schematic diagrams of exemplary route candidate images processed by a curve evolution process at different stages are shown consistent with some embodiments of the present disclosure.

As illustrated, a motorcycle is used as an exemplary object-of-interest in a query image. By performed the step S330, a curve evolution from the border of the motorcycle to a route candidate on a map is shown.

In FIG. 6A, the one or more contours of object-of-interest determined in step S320 can be fused on a map image, and the one or more contours of object-of-interest can be used as an initial curve 6B1 for the curve evolution process. In FIG. 6B, the curve 6B1 is evolving from the contours of object-of-interest to match different routes on the map image. In FIG. 6C, a route candidate 6C 1 having the maximum area overlap with the one or more contours of object-of-interest can be determined on the map image.

Turning back to FIG. 3, at step S340, an output image including the object-of-interest, the route having the maximum area overlap with the contour of object-of-interest can be generated.

In some embodiments, the output image can be generated by using any suitable customizable rendering techniques. For example, the object-of-interest can be half-transparently blended onto the matched route indicating the resemblance between a desirable feature and a target share.

Figure 7:
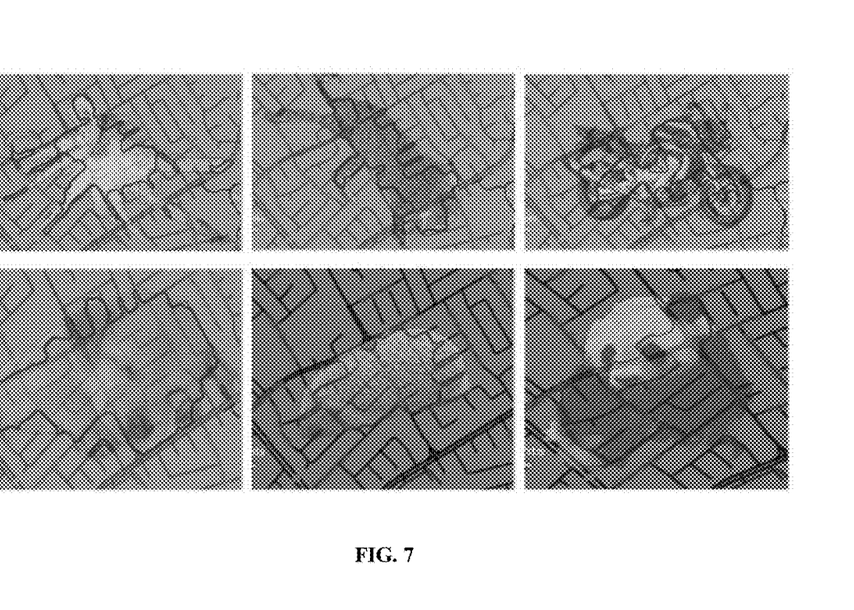
FIG. 7 illustrates schematic diagrams of exemplary output rendering results of the method for recommending and sharing customized multimedia route planning consistent with some embodiments of the present disclosure.

Referring to FIG. 7, schematic diagrams of exemplary output rendering results of the method for recommending and sharing customized multimedia route planning consistent with some embodiments of the present disclosure. As illustrated, the interactive segmentation results can be half-transparently fused onto the map images respectively, and the matched routes having the maximum area overlap with the contour of object-of-interest can be highlighted on the map images respectively.

Finally, at step S350, the output rendering result can be recommended to the user, e.g., presented on the display 206 of the terminal 102 to the user. Further, based on the instructions of the user, the output rendering result can be shared on one or more social network multimedia platforms, such as Facebook, WeChat, etc.

Figure 8:
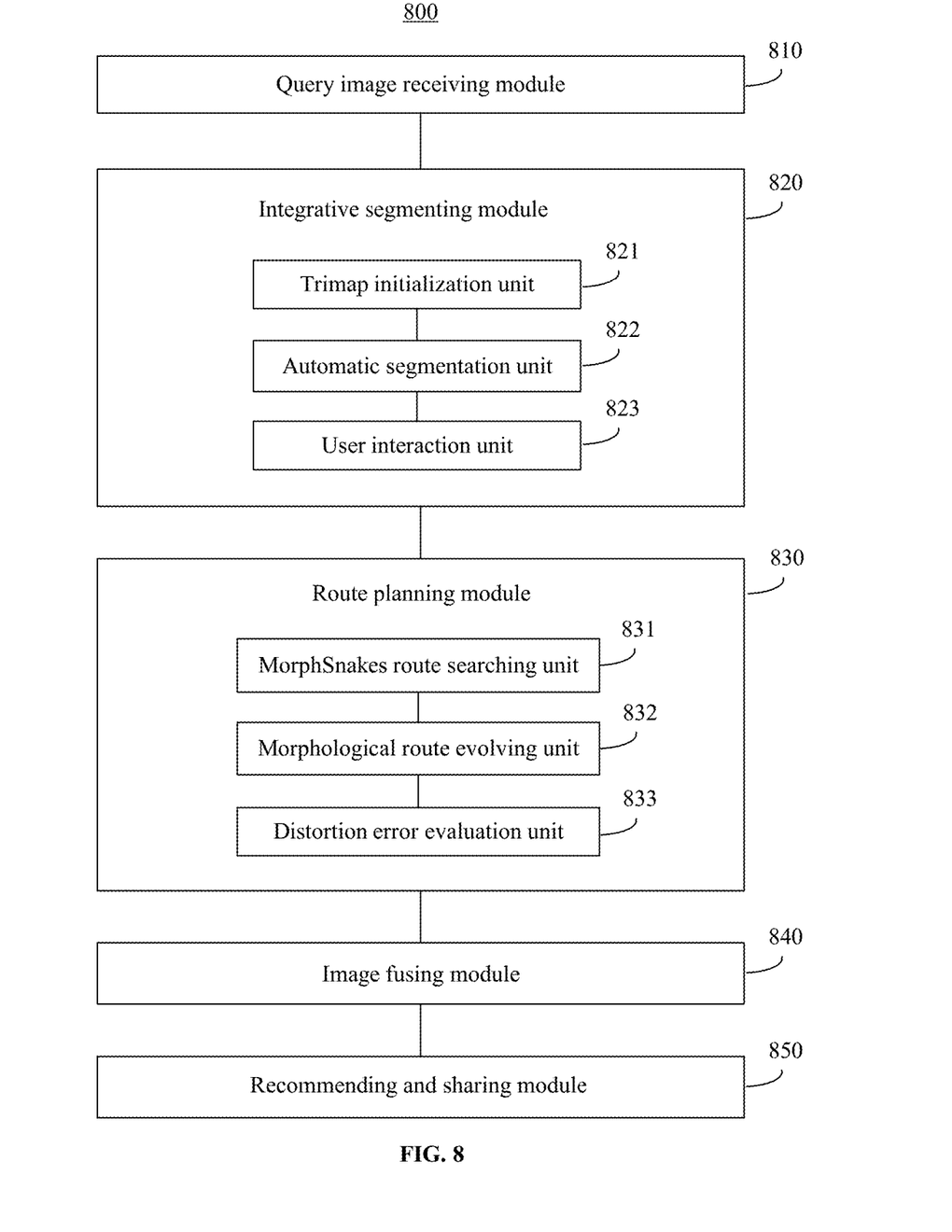
FIG. 8 illustrates a schematic structural diagram of an exemplary system for recommending and sharing customized multimedia route planning consistent with some embodiments of the present disclosure.

Referring to FIG. 8, a schematic structural diagram of an exemplary system for recommending and sharing customized multimedia route planning is shown consistent with some embodiments of the present disclosure.

As illustrated, the system 800 can include a query image receiving module 810, an integrative segmenting module 820, a route planning module 830, an image fusing module 840, and a recommending and sharing module 850.

The query image receiving module 810 can be configured for receiving a query image from a user, and receiving additional user specified information with the query image. The query image containing an object-of-interest of the user.

The additional user specified information includes an object bounding box, a user geographical location, a map ratio, and an expected route length The integrative segmenting module 820 can be configured for performing an integrative segmentation process to determine one or more contours of the object-of-interest in the query image. In some embodiments, integrative segmenting module 820 includes a trimap initialization unit 821, an automatic segmentation unit 822, and a user interaction unit 823.

The trimap initialization unit 821 can be configured for performing an initialization of the query image to obtain an initial trimap, including: determining an initial foreground region, an initial background region, and an initial remaining region of the query image based on the object bounding box; and setting Gaussian Mixture Models to each pixel in the initial foreground region and the initial background region.

The automatic segmentation unit 822 can be configured for performing a first automatic segmentation process to identify an approximate border of the object-of-interest from the initial trimap, including: assigning Gaussian Mixture Model components to each pixel in the initial remaining region; learning Gaussian Mixture Model parameters from data of grey values of the initial trimap; determining an estimate segmentation by using a minimum cut estimation algorithm to solve an equation of Gibbs energy, wherein the equation of Gibbs energy depends on the Gaussian Mixture Model components and the Gaussian Mixture Model parameters; repeating the above three steps until a condition of convergence of iterative minimization is satisfied; and performing a border matting to generate the approximate border of the object-of-interest from the initial trimap.

The user interaction unit 823 can be configured for performing a user interaction process to edit a segmentation result of the first automatic segmentation process to generate an updated trimap, including: receiving user input on the segmentation result of the first automatic segmentation process, wherein the user input includes at least one of a background brush and a foreground brush; fixing pixels corresponding to areas indicated by the background brush and the foreground brush respectively; and updating the segmentation result of the query image accordingly to generate the updated trimap.

The automatic segmentation unit 822 can be further configured for performing a second automatic segmentation process to identify an accurate border of the object-of-interest from the updated trimap, including: determining an updated segmentation of the update trimap by using a minimum cut estimation algorithm; and performing a refine operation to identify the accurate border of the object-of-interest from the updated trimap.

In some embodiments, the refine operation can be optionally, and can include: assigning Gaussian Mixture Model components to each pixel in an updated remaining region of the update trimap; learning Gaussian Mixture Model parameters from data of grey values of the updated trimap; determining an estimate segmentation by using a minimum cut estimation algorithm to solve an equation of Gibbs energy, wherein the equation of Gibbs energy depends on the Gaussian Mixture Model components and the Gaussian Mixture Model parameters; repeating the above three steps until a condition of convergence of iterative minimization is satisfied; and performing a border matting to generate the accurate border of the object-of-interest from the updated trimap; the accurate border includes the one or more contours of object-of-interest.

The route planning module 830 can be configured for determining a route having a maximum area overlap with the one or more contours of object-of-interest on a map image. In some embodiments, the route planning module 830 can include a MorphSnakes route searching unit 831, a morphological route evolving unit 832, and a distortion error evaluation unit 833.

The MorphSnakes route searching unit 831 can be configured for employing a MorphSnakes algorithm to search a route candidate on the map image in eight different orientations, including: approximating numerical solutions of partial differential equations of curve evolution of the route candidate by successively applying a set of curvature morphological operators, the set of curvature morphological operators are defined on a binary level-set function; and introducing a norm metric between two successive level sets of the binary level-set function to assess a convergence of the curve evolution of the route candidate.

The morphological route evolving unit 832 can be configured for using a morphological Geodesic Active Contour framework to evolve the route candidate by minimizing an energy functional.

The distortion error evaluation unit 833 can be configured for performing an evaluation method using distortion error to determine the route having the maximum area overlap with the one or more contours of object-of-interest on the map image The image fusing module 840 can be configured for generating an output image including the object-of-interest and the route.

The recommending and sharing module 850 can be configured for recommending the output image to the user, and sharing the output image on a social network platform.

Accordingly, a method and a system for recommending and sharing customized multimedia route planning are provided. The disclosed method and system enable more personalized route planning for individuals with very active lifestyles. To build a bigger and more engaged audience, users can customize route planning, characterized by individual traits such as hobbies, personal goals, religious beliefs, and even the mood each time an exercise is needed.

In the disclosed method and system for recommending and sharing customized multimedia route planning, an interactive MorphSnakes algorithm enables more personalized route planning tailored for individuals based on their personal image collections. In order to find route candidates that are potentially matching user-specified contour after an interactive segmentation process, the interactive MorphSnakes algorithm can approximate numerical solutions of PDEs by successive application of a set of curvature morphological operators defined on a binary level set and with equivalent infinitesimal behavior. By introducing a metric to evaluate the convergence of curve evolution in the light of its stability when the curve approaches the desired routes. With this convergence criteria, routes candidates can be naturally generated. Further, the distortion error between each route candidate and user-specified contour can be minimized by performing a shrinking minimization process, thereby finalizing the best matched route as the recommendation to the user.

In some embodiments, the disclosed image-based route recommending and sharing method and system can be extended to other multimedia based target recommending and sharing. For example, besides the image input, a multimedia input can also include text, audio, video, animation, thumbnail, any other suitable type of media type input, or a combination thereof. Then the multimedia based target recommending and sharing method can interactively craft a desirable feature, such as a shape, a color, a dynamic condition, a rhythm, etc., from the multimedia input. Next, a target to be shared can be determined by a user. The obtained feature can then be overlaid on a target platform, e.g., a map application, a photograph album application, a media playback application, etc., to automatically craft and search the target share, e.g., a personalized route, a personalized picture, a personalized music, a personalized video, etc. After fusing the original multimedia input and the target share, the output can then be rendered for social-media sharing.

The disclosed customized multimedia route recommending and sharing method and system enable more personalized route planning tailored for individuals bored with routines and maintaining a very active lifestyle. For example, regular joggers/bikers could benefit from customizing various routes characterized by individual traits such as hobbies, personal goals, religious beliefs, and even the mood each time an exercise is needed. With the prevailing multimedia applications, personal multimedia content collections in mobile devices can be used for designing individual traits. And the personalized route can be recommended to users and can be shared on various social network multimedia platforms, thereby phenomenally changing the social dynamics to achieve better human interaction experiences.

It should be noted that, the above steps of the flow diagrams of FIGS. 3 and 4 can be executed or performed in any order or sequence not limited to the order and sequence shown and described in the figures. Also, some of the above steps of the flow diagrams of FIGS. 3 and 4 can be executed or performed substantially simultaneously where appropriate or in parallel to reduce latency and processing times. Furthermore, it should be noted that FIGS. 3 and 4 are provided as an example only. At least some of the steps shown in the figures may be performed in a different order than represented, performed concurrently, or altogether omitted.

In addition, the flowcharts and block diagrams in the figures illustrate various embodiments of the disclosed method and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions. It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in. It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

The disclosed subject matter provides a computer program product that includes computer-readable storage medium storing program codes. The program code includes instructions for performing the disclosed method. The specific implementations of the disclosed method can be referred to the various embodiments described above in connection with FIGS. 1-8.

Those skilled in the art can clearly understand that, for convenience and simplicity of description, the specific working process of the systems, modules and units described above can be referred to the corresponding processes of various embodiments of the disclosed method described above.

In various embodiments provided herein, it should be understood that, the disclosed system and method can be realized through other ways. The disclosed embodiments of the system are merely illustrative. For example, the divisions of modules and units are merely divisions of logical functions which may be divided by other ways in the actual implementation. As another example, multiple units or modules can be combined or be integrated into another system. Some features can be ignored, or not be executed. At another point, the illustrated or discussed mutual coupling, direct coupling, or communicating connection can be coupled or connected through electrical, mechanical, or other type of communication interfaces.

A module/unit described as a separate member may be or may not be physically separated. A component illustrated as a module/unit may be or may not be a physical module/unit. A module/unit can be located in one place, or be distributed to multiple network elements. According to actual needs, a part of or all of the modules/units can be selected to realize the purpose of disclosed subject matter.

Further, various functional modules/units in the various embodiments of the disclosed subject matter can be integrated in a processing module/unit, or can be separate physical modules/units. Two or more functional modules/units can also be integrated in one module/unit.

If the functions are implemented as software functional modules/units, and being used or sold as a standalone product, the product can be stored in a computer readable storage medium. Based on this understanding, an essential part of the technical nature of the disclosed subject matter, or a part of the technical nature of the disclosed subject matter that can contribute to prior arts, or any part of the technical nature of the disclosed subject matter, can be embodied in a form of a computer software product. The computer software product can be stored in a storage medium, including multiple instructions to instruct a computer device (may be a personal computer, a server, or a network equipment) to perform all or part of the steps of the disclosed method according to various embodiments. The aforementioned storage media can include: U disk, removable hard disk, read only memory (ROM), random access memory (RAM), floppy disk, CD-ROM, or any other suitable medium that can store program codes.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. A method for recommending and sharing customized multimedia route planning, comprising:
receiving a query image from a user, the query image containing an object-of-interest of the user;
performing an integrative segmentation process to determine one or more contours of the object-of-interest in the query image;
determining a route having a maximum area overlap with the one or more contours of object-of-interest on a map image;
generating an output image including the object-of-interest and the route; and
recommending the output image to the user, and sharing the output image on a social network platform.

2. The method of claim 1, further comprising:
receiving additional user specified information with the query image;
wherein the additional user specified information includes an object bounding box, a user geographical location, a map ratio, and an expected route length.

3. The method of claim 2, wherein:
the map image is obtained from an online map application based on the user geographical location and the map ratio; and
the route is determined based on the one or more contours of the object-of-interest in the query image, the map image, and the expected route length.

4. The method of claim 2, wherein the integrative segmentation process comprises:
performing an initialization of the query image to obtain an initial trimap;
performing a first automatic segmentation process to identify an approximate border of the object-of-interest from the initial trimap;
performing a user interaction process to edit a segmentation result of the first automatic segmentation process to generate an updated trimap; and
performing a second automatic segmentation process to identify an accurate border of the object-of-interest from the updated trimap.

5. The method of claim 4, wherein performing an initialization of the query image comprises:
determining an initial foreground region, an initial background region, and an initial remaining region of the query image based on the object bounding box; and
setting Gaussian Mixture Models to each pixel in the initial foreground region and the initial background region.

6. The method of claim 4, wherein performing the first automatic segmentation process comprises:
assigning Gaussian Mixture Model components to each pixel in the initial remaining region;
learning Gaussian Mixture Model parameters from data of grey values of the initial trimap;
determining an estimate segmentation by using a minimum cut estimation algorithm to solve an equation of Gibbs energy, wherein the equation of Gibbs energy depends on the Gaussian Mixture Model components and the Gaussian Mixture Model parameters;
repeating the above three steps until a condition of convergence of iterative minimization is satisfied; and
performing a border matting to generate the approximate border of the object-of-interest from the initial trimap.

7. The method of claim 4, wherein performing the user interaction process comprises:
receiving user input on the segmentation result of the first automatic segmentation process, wherein the user input includes at least one of a background brush and a foreground brush;
fixing pixels corresponding to areas indicated by the background brush and the foreground brush respectively; and
updating the segmentation result of the query image accordingly to generate the updated trimap.

8. The method of claim 4, wherein performing the second automatic segmentation process comprises:
determining an updated segmentation of the update trimap by using a minimum cut estimation algorithm; and
performing a refine operation to identify the accurate border of the object-of-interest from the updated trimap.

9. The method of claim 8, wherein the refine operation comprises:
assigning Gaussian Mixture Model components to each pixel in an updated remaining region of the update trimap;
learning Gaussian Mixture Model parameters from data of grey values of the updated trimap;
determining an estimate segmentation by using a minimum cut estimation algorithm to solve an equation of Gibbs energy, wherein the equation of Gibbs energy depends on the Gaussian Mixture Model components and the Gaussian Mixture Model parameters;
repeating the above three steps until a condition of convergence of iterative minimization is satisfied; and
performing a border matting to generate the accurate border of the object-of-interest from the updated trimap;
wherein the accurate border includes the one or more contours of object-of-interest.

10. The method of claim 1, wherein determining the route having the maximum area overlap with the one or more contours of object-of-interest on the map image comprises:
employing a MorphSnakes algorithm to search a route candidate on the map image in eight different orientations;
using a morphological Geodesic Active Contour framework to evolve the route candidate by minimizing an energy functional; and
performing an evaluation method using distortion error to determine the route having the maximum area overlap with the one or more contours of object-of-interest on the map image.

11. The method of claim 10, wherein the energy functional is represented as:

$$E(C)=\int_0^{length(C)} g(I)(C(s))ds = \int_0^1 g(I)(C(p)\cdot|C_p|)dp,$$

wherein $ds=|C_p|dp$ is an Euclidean arc-length parametrization of a curve C; and
$g(I)$ is a mapping: $\mathbb{R}^d \to \mathbb{R}^+$, $x \to g(I)(x)$, which allows selecting regions-of-interest in the image I.

12. The method of claim 10, wherein employing the MorphSnakes algorithm comprises:
approximating numerical solutions of partial differential equations of curve evolution of the route candidate by successively applying a set of curvature morphological operators;

wherein the set of curvature morphological operators are defined on a binary level-set function.

13. The method of claim 12, further comprising:
introducing a norm metric between two successive level sets of the binary level-set function to assess a convergence of the curve evolution of the route candidate.

14. A system for recommending and sharing customized multimedia route planning, comprising:
one or more hardware processors, and
a memory, wherein the one or more hardware processors are configured to:
receive a query image from a user, the query image containing an object-of-interest of the user;
perform an integrative segmentation process to determine one or more contours of the object-of-interest in the query image;
determine a route having a maximum area overlap with the one or more contours of object-of-interest on a map image;
generate an output image including the object-of-interest and the route; and
recommend the output image to the user, and share the output image on a social network platform.

15. The system of claim 14, wherein the one or more hardware processors are further configured to:
receive additional user specified information with the query image;
wherein:
the additional user specified information includes an object bounding box, a user geographical location, a map ratio, and an expected route length;
the map image is obtained from an online map application based on the user geographical location and the map ratio; and
the route is determined based on the one or more contours of an object-of-interest in the query image, the map image, and the expected route length.

16. The system of claim 15, wherein the one or more hardware processors are further configured to:
perform an initialization of the query image to obtain an initial trimap;
perform a first automatic segmentation process to identify an approximate border of the object-of-interest from the initial trimap; and
perform a user interaction process to edit a segmentation result of the first automatic segmentation process to generate an updated trimap;
wherein a second automatic segmentation process is further performed to identify an accurate border of the object-of-interest from the updated trimap.

17. The system of claim 16, wherein the one or more hardware processors are further configured to:
determine a foreground region, a background region, and a remaining region of the query image based on the object bounding box; and
set Gaussian Mixture Models to each pixel in the foreground region and the background region.

18. The system of claim 16, wherein the one or more hardware processors are further configured to:
assign Gaussian Mixture Model components to each pixel in the remaining region;
learn Gaussian Mixture Model parameters from data of grey values of a trimap;
determine an estimate segmentation by using a minimum cut estimation algorithm to solve an equation of Gibbs energy, wherein the equation of Gibbs energy depends on the Gaussian Mixture Model components and the Gaussian Mixture Model parameters;
repeat the above three steps until a condition of convergence of iterative minimization is satisfied; and
perform a border matting to generate a border of the object-of-interest from the trimap.

19. The system of claim 16, wherein the one or more hardware processors are further configured to:
receive user input on the segmentation result of the first automatic segmentation process, wherein the user input includes at least one of a background brush and a foreground brush;
fix pixels corresponding to areas indicated by the background brush and the foreground brush respectively; and
update the segmentation result of the query image accordingly to generate the updated trimap.

20. The system of claim 15, wherein the one or more hardware processors are further configured to:
employ a MorphSnakes algorithm to search a route candidate on the map image in eight different orientations;
use a morphological Geodesic Active Contour framework to evolve the route candidate by minimizing an energy functional including:
approximate numerical solutions of partial differential equations of curve evolution of the route candidate by successively applying a set of curvature morphological operators, wherein the set of curvature morphological operators are defined on a binary level-set function, and
introduce a norm metric between two successive level sets of the binary level-set function to assess a convergence of the curve evolution of the route candidate; and
perform an evaluation method using distortion error to determine the route having the maximum area overlap with the one or more contours of object-of-interest on the map image.

* * * * *